Sept. 26, 1961 J. R. WILLIAMS 3,001,779
AIR HEATER
Filed June 6, 1958 2 Sheets-Sheet 1
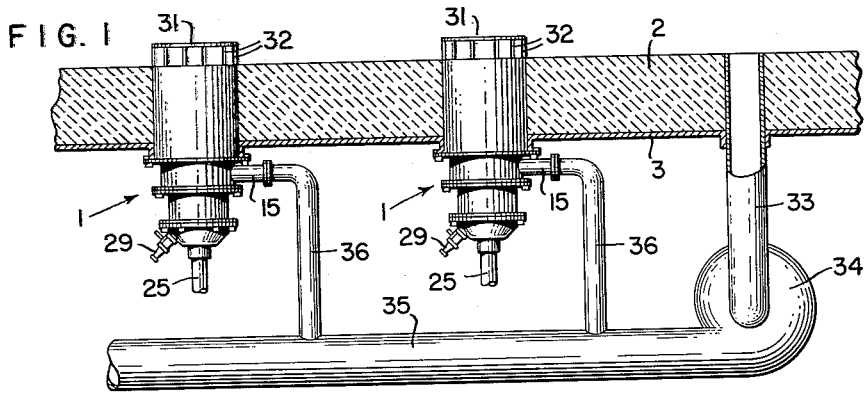
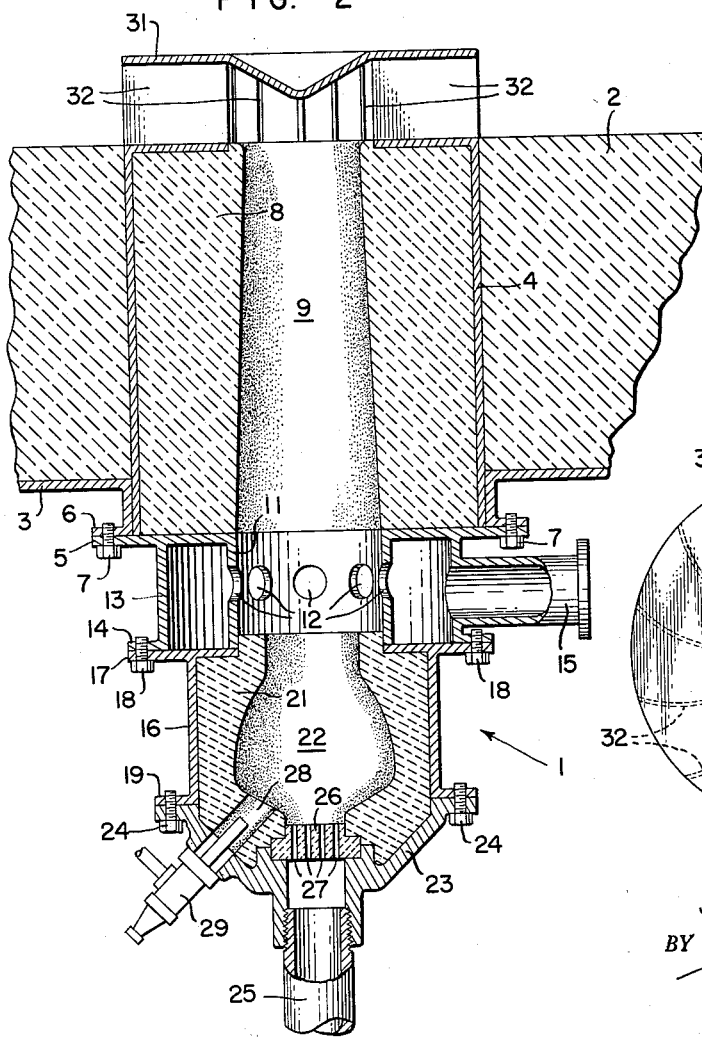
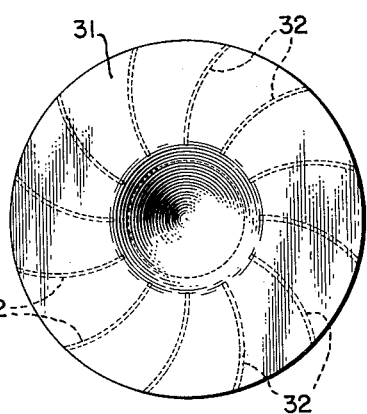
INVENTOR.
JOHN ROGER WILLIAMS
BY
ATTORNEY Sept. 26, 1961  J. R. WILLIAMS  3,001,779
AIR HEATER Filed June 6, 1958  2 Sheets-Sheet 2

INVENTOR.
JOHN ROGER WILLIAMS

BY
ATTORNEY.

United States Patent Office 3,001,779
Patented Sept. 26, 1961

3,001,779
AIR HEATER
John Roger Williams, Ambler, Pa., assignor to Selas Corporation of America, Dresher, Pa., a corporation of Pennsylvania
Filed June 6, 1958, Ser. No. 740,251
3 Claims. (Cl. 263—19)

The present invention relates to convection heating, and more particularly to what is known as an air heater and apparatus used therewith to produce and circulate large volumes of heated gas in an oven or other enclosed space.

In many applications it is desirable to introduce and circulate heated gas into an oven or other enclosure such as a duct. It is usually desired to introduce the hot gas into the enclosure in such a fashion that the enclosure is heated evenly throughout. Frequently it is desirable to vary the temperature of the gases being introduced so that the temperature in the enclosure can be maintained at a value lower than the temperature of the heated gases.

It is an object of the invention to provide apparatus for producing hot products of combustion and for introducing them into an enclosure. It is a further object of the invention to provide apparatus for circulating hot gases in an enclosed space. Another object of the invention is to provide apparatus for mixing a plurality of gases that are introduced into an enclosure.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

Figure 5:
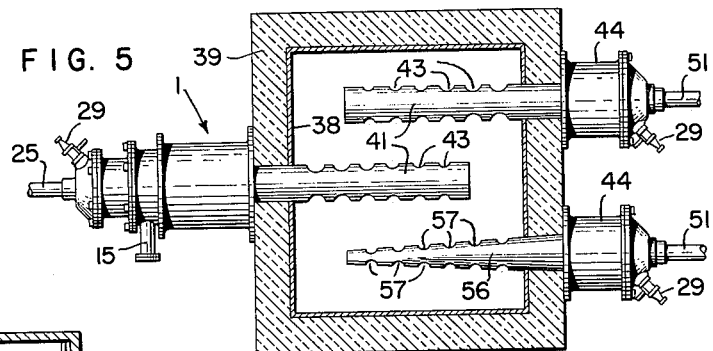
Figure 4:
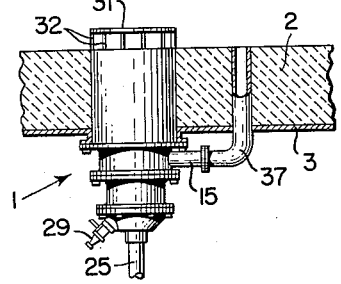
Figure 6:
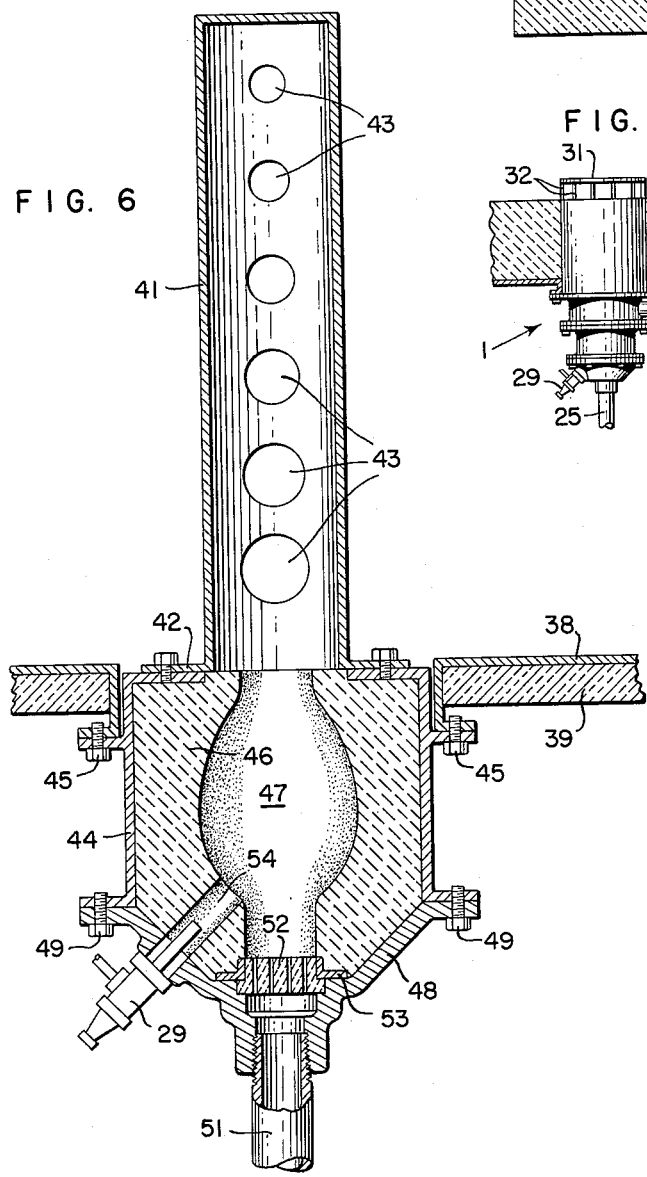

In the drawings:
FIG. 1 shows the heater in position in an oven wall;
FIG. 2 is a section through the heater;
FIG. 3 is an end view of the portion of the heater extending into the oven;
FIGS. 4 and 5 show other ways of mounting the heater in the walls of an enclosure; and
FIG. 6 is a section of a modified form of the heater.

In following the present invention there is provided a heater which completely burns a mixture of fuel and air and which discharges the products of combustion into an enclosure, such as an oven or duct, to heat the atmosphere within the enclosure. Referring to FIG. 1, there is shown a pair of the heater units 1 which extend into an oven or other enclosure, a wall of which is shown at 2. This wall may be constructed in accordance with usual industrial practice and is provided with the usual sheet metal backing 3 to which the heater units are attached.

Referring to FIG. 2, the heater 1 is shown as comprising a cylindrical casing or shell 4 which has a radially extending plate 5 attached to one end. The outer edge of this plate is attached by means of bolts 7, to a corresponding flange 6 formed on the oven shell to hold the heater in position in the oven wall. The casing has in it a refractory tunnel block 8 that is provided with an axial opening 9 which is somewhat conical in cross-section. Extending axially from the inner edge of plate 5 is an inner sleeve 11 that has a plurality of openings 12 in it and from an intermediate portion an outer axial sleeve 13 that terminates in a radially extending flange 14. Sleeve 13 is provided with an inlet 15 by means of which a gas can be introduced to the space between sleeves 11 and 13.

A second cylindrical casing 16, which is located coaxially with casing 4 and sleeve 11, is provided with a radially extending flange 17 that abuts against the ends of sleeves 11 and 13 to form therewith an annular chamber extending around a central opening aligned with the passage 9 in tunnel block 8. This casing is held against flange 14 by means of a flange 17 and bolts 18. Casing 16 has at its other end a radially extending flange 19. Received within casing 16 is a refractory block 21, the center of which forms a combustion chamber 22. This block is held in position in casing 16 by an end casting 23 which is attached by bolts 24 to flange 19. Fuel is supplied to casting 23 through a fuel supply pipe 25 and passes to combustion chamber 22 through a burner screen 26 that is provided with a plurality of axial passages 27. It will be seen that the screen is held rigidly in position across the lower end of the combustion chamber by means of a flange thereon that is located between block 21 and a suitable shoulder on casting 23. Block 21 is provided with an opening 28 which extends to the combustion chamber and in which is located an ignition and pilot flame device 29 that may take the form of the device shown in my co-pending application Serial No. 670,950, filed July 10, 1957.

That portion of the heater extending into the oven or other enclosure is provided with a gas distributor including a disc 31 having a dished center portion which directs the products of combustion coming through tunnel 9 in a radial direction. Disc 31 is separated from the end of casing 4 by means of a plurality of vanes 32 which form discharge passages between them. These vanes may extend in any desired direction, but as shown herein are slightly curved so that the products of combustion being discharged into the oven will be given a swirling motion.

In the operation of the device a mixture of fuel and air, which is preferably in stoichiometric proportions, is discharged through screen 26, ignited by pilot 29, and burned in combustion chamber 22. As the products of combustion travel from combustion chamber 22 and through passage 9, they are discharged with a swirling motion into the enclosure to mix with and heat the atmosphere therein. These products of combustion are quite hot. From time to time it is desired to temper these products of combustion and to increase their volume. This may readily be done by withdrawing some of the furnace atmosphere and mixing it with them. This can readily be accomplished with the present burner. As shown herein, there is provided an exhaust duct 33 leading from the interior of the oven to an exhaust fan 34, from which it is discharged through a manifold 35, that is preferably insulated. Ducts 36 leading from the manifold are connected, as shown in FIG. 1, with intake 15 of the chamber formed between flanges 11 and 13. The gas flowing into this chamber is discharged radially through openings 12 into the products of combustion and is mixed therewith to temper them as well as to increase their volume. By varying the speed of the fan or by the use of suitable dampers in the ducts the volume of gas mixed with the products of combustion, and therefore their temperature, can be varied. Thus, the atmosphere within the oven is continually circulated and reheated without the introduction of oxygen as would be the case if 15 was open to the atmosphere. It must be appreciated, however, that air can be forced through manifold 35 if desired so that gases with an oxidizing character would be introduced into the furnace. It is also obvious that a gas having any desired characteristic, such as reducing, could be introduced through inlets 15 and heated as the gas is mixing with the hot products of combustion.

In FIG. 4 there is shown a heater of the type just described in which the aspirating effect of the products of combustion flowing from chamber 22 to passage 9 is used to draw a tempering gas into the heater. If the tempering gas is to be the oven atmosphere a duct 37 is connected directly from the interior of the oven with inlet 15 of the heater. The volume of gases that are withdrawn from the oven to be recirculated in this case are not as large as would be the case if a fan was used. Recirculation and reheating of the oven atmosphere, however, is accomplished.

In some cases it may be desirable to heat air flowing through a duct or the like. This may be accomplished by the arrangement shown in FIG. 5 wherein there is disclosed a duct 38 that may or may not be covered with insulation 39. The heater in this case is provided with an elongated distributor 41 that extends substantially across the duct. This distributor may be fastened to the heater by means of a flange 42 as shown in FIG. 6. In any event, it is provided with a series of diametrically opposed openings 43 that progressively decrease in diameter as the distance from the heater increases. When the heater is placed in the duct with the distributor extending across the duct, it is rotated until the openings are at right angles to the path of flow of air through the duct as best shown in FIG. 5 of the drawings and then fastened in position. The products of combustion will be discharged across the duct to be picked up and carried by the air flowing therethrough. By making the openings of progressively decreasing diameters as they are removed from the heater it will be insured that there is an even distribution of the products of combustion from one side to the other of the duct.

If recirculation of air in the enclosure to which the hot products of combustion are introduced is not necessary or if the introduction of other gas to the enclosure is not necessary the heater can take a slightly different form such as that shown, for example, in FIG. 6 of the drawings. In this figure the heater is provided with a cylindrical casing 44 having a radially extending flange on it that is bolted to a complementary flange provided on the duct. In view of the fact that recirculated air is not introduced to the heater, casing 44 is axially longer than is casing 16 of the form of the invention just described. Casing 44 supports refractory block 46 that is provided with a combustion chamber 47. The block is kept in the casing by means of an end casting 48 fastened thereto by bolts 49 passing through complementary flanges on the casing and casting. A fuel mixture is supplied to the combustion chamber through a supply pipe 51 and a burner screen 52 located across the end thereof. In this case the screen is shown as being attached to casting 48 by a suitable collar 53, instead of being held in position as shown in FIG. 2. Combustion chamber 47 is provided with an opening 54 through which a pilot and ignition device 29 may be inserted.

In the operation of this form of the invention a combustible mixture is introduced into the combustion chamber 47 where it is ignited by the pilot device. Combustion will take place in this chamber and the hot products of combustion will be discharged axially into distributor 41 from which they are discharged through openings 43. Due to the pressure change of these gases as they are flowing into the distributor and varying size of the openings 43, the gases are discharged substantially uniformly in volume through these openings across an area of the duct. Depending upon the amount of heat that must be imparted to the air flowing through the duct, one or more of these heaters can be used. As shown in FIG. 5, three heaters are used with alternate heaters attached to opposite sides of the duct.

The lower heater shown in FIG. 5 has a distributor 56 that is tapered rather than cylindrical. In this case the discharge openings 57 are made the same size, since the reduction in diameter of the distributor insures that the pressure therein will be sufficient to give an even discharge of the products of combustion into the duct.

From the above description it will be seen that I have provided an air heater which can be used to heat the atmosphere in an oven, duct or other enclosure. With this apparatus the products of combustion can be discharged directly into the enclosure at high temperatures or they can be mixed with other gases, depending upon the application with which they are used. The apparatus is such that good mixing of the hot gases discharged into the enclosure is obtained directly from the heater without the necessity for providing fans or other apparatus in the enclosure to circulate the atmosphere therein.

While in accordance with the provisions of the statutes, I have illustrated and described the best form of embodiment of my invention now known to me, it will be apparent to those skilled in the art that changes may be made in the form of the apparatus disclosed without departing from the spirit and scope of the invention set forth in the appended claims, and that in some cases certain features of my invention may be used to advantage without a corresponding use of other features.

What is claimed is:

1. In combination, an oven having a wall provided with an opening therein, a heater having a portion thereof received in said opening, said heater having a gas distributor on an end thereof which distributor extends into said oven, means to attach said heater to said oven, said heater being provided with means forming a path for gases including a refractory lined combustion chamber, an annular chamber surrounding said path, a refractory lined passage and said distributor, means to supply fuel to said combustion chamber to be burned therein, the products of combustion flowing through said path into said oven, means to withdraw gas from said oven and introduce it into said annular chamber, and means through which said gas is moved radially inward from said annular chamber to mix with the products of combustion traveling in said path.

2. A system for heating the interior of an oven or the like comprising an oven having a wall with a plurality of openings therein, a heater for each opening, each heater having a portion thereof received in one of said openings, means to fasten said heaters in said wall, each heater being provided with a refractory lined combustion chamber in which fuel is burned and means forming a refractory lined passage through which products of combustion flow from said chamber to said oven and a gas distributor located in said oven to distribute said products of combustion therein, means forming an annular chamber located between said combustion chamber and said passage, said chamber being provided with openings directed radially inward thereof, and means to supply a gas to said annular chamber to flow through said openings into the products of combustion to mix therewith.

3. The combination of claim 2 in which said means to supply gas includes means connected with the interior of said oven whereby gas from said oven is circulated through said heater.

References Cited in the file of this patent

UNITED STATES PATENTS

| | | |
|---|---|---|
| 646,218 | Hollingsworth | Mar. 27, 1900 |
| 1,933,020 | Leamon | Oct. 31, 1933 |
| 1,995,003 | MacKenzie et al. | Mar. 19, 1935 |
| 2,403,431 | Dobrin | July 9, 1946 |
| 2,445,466 | Arnhym | July 20, 1948 |
| 2,538,888 | Smith | Jan. 23, 1951 |
| 2,549,347 | Van Tuyl | Apr. 17, 1951 |
| 2,832,580 | Hess | Apr. 29, 1958 |
| 2,835,322 | Vignere | May 20, 1958 |
| 2,851,337 | Heller | Sept. 9, 1958 |